(12) United States Patent
Lee (10) Patent No.: US 11,598,679 B2
(45) Date of Patent: Mar. 7, 2023

(54) TEMPERATURE MEASURING DEVICE USING OPTICAL FIBER BRAGG GRATING SENSOR

(71) Applicant: FBG KOREA INC., Daejeon (KR)

(72) Inventor: Geum Suk Lee, Gyeryong-si (KR)

(73) Assignee: FBG KOREA INC., Daejeon (KR)

( * ) Notice: Subject to any disclaimer, the term of this patent is extended or adjusted under 35 U.S.C. 154(b) by 174 days.

(21) Appl. No.: 16/980,078

(22) PCT Filed: Aug. 9, 2019

(86) PCT No.: PCT/KR2019/010101
§ 371 (c)(1),
(2) Date: Sep. 11, 2020

(87) PCT Pub. No.: WO2020/036380
PCT Pub. Date: Feb. 20, 2020

(65) Prior Publication Data
US 2021/0010874 A1 Jan. 14, 2021

(30) Foreign Application Priority Data
Aug. 14, 2018 (KR) .................. 10-2018-0094773

(51) Int. Cl.
*G01K 11/3206* (2021.01)
*G01D 5/353* (2006.01)
*G01K 1/08* (2021.01)

(52) U.S. Cl.
CPC ..... *G01K 11/3206* (2013.01); *G01D 5/35354* (2013.01); *G01K 1/08* (2013.01)

(58) Field of Classification Search
USPC .................................. 374/161, 131
See application file for complete search history.

(56) References Cited

U.S. PATENT DOCUMENTS

| 6,351,987 | B1 | 3/2002 | Winston et al. |
| 2004/0202401 | A1 | 10/2004 | Berg et al. |
| 2010/0061678 | A1* | 3/2010 | Swinehart .......... G01K 11/3206 264/1.27 |

(Continued)

FOREIGN PATENT DOCUMENTS

| JP | 5193111 B2 | 5/2013 |
| KR | 10-0992628 B1 | 11/2010 |
| KR | 10-1057309 B1 | 8/2011 |

(Continued)

*Primary Examiner* — Mirellys Jagan
(74) *Attorney, Agent, or Firm* — Novick, Kim & Lee PLLC; Jae Youn Kim (57) ABSTRACT

A temperature measuring device using an optical fiber Bragg grating sensor is proposed, which includes: an optical fiber wound one or more times on a ring part, which has a preset diameter by rotating a part of the optical fiber once, thereby maintaining a predetermined shape; a housing in which the optical fiber is arranged; and an optical fiber Bragg grating sensor provided in a straight line part of the optical fiber, and thus the present invention prevents deformation of the optical fiber and the optical fiber Bragg grating sensor, which are arranged to be spaced apart at a predetermined distance in the housing, even when deformation occurs in the housing according to a change in the outside temperature, thereby accurately measuring temperature without distortion.

6 Claims, 7 Drawing Sheets

(56) References Cited

U.S. PATENT DOCUMENTS

2010/0247055 A1* 9/2010 Arashitani ............ H01S 3/0405
385/137

FOREIGN PATENT DOCUMENTS

| KR | 10-1352063 B1 | 1/2014 |
|----|---------------|--------|
| KR | 10-1504028 B1 | 3/2015 |
| WO | 2010/030587 A2 | 3/2010 |

* cited by examiner

TEMPERATURE MEASURING DEVICE USING OPTICAL FIBER BRAGG GRATING SENSOR

TECHNICAL FIELD

The present invention relates to a temperature measuring device using an optical fiber Bragg grating sensor, and more particularly, to a temperature measuring device using an optical fiber Bragg grating sensor to measure a temperature by detecting a change in wavelength of light reflected from each Bragg grating according to changes in external conditions such as temperature.

BACKGROUND ART

In general, an optical fiber sensor refers to a sensor that estimates an amount to be measured by using changes in the intensity of light passing through an optical fiber, the refractive index, length and mode of the optical fiber, a polarization state, and the like.

The optical fiber is mainly formed of quartz glass, and composed of a core part serving as a center of the optical fiber added with germanium to slightly increase the refractive index, and a cladding part serving as an overlapping layer for protecting the center.

Light incident to the optical fiber core is reflected at an interface between a core layer having a high refractive index and a cladding layer having a low refractive index and propagated along the core part of the optical fiber.

The optical fiber sensor is classified into intensity type, phase type, diffraction grating type, mode modulation type, polarization type, and distribution measurement type according to a used effect, and provides various measured values such as voltage, current, temperature, pressure, strain, rotation rate, sound, and gas concentration.

The fiber optic sensor facilitates an ultra-precision broadband measurement, is not influenced by electromagnetic waves, is easily measured remotely, does not use electricity in a sensor unit, and has an excellent corrosion resistance due to a silica material, so there is no limit in usage environments.

A representative of the optical fiber sensors is a fiber Bragg grating sensor (hereinafter referred to as 'FBG sensor') type optical fiber sensor.

The FBG sensor refers to a sensor that uses properties in which several fiber Bragg gratings are engraved on a strand of the fiber by predetermined lengths, and then a wavelength of light reflected from each Bragg grating varies according to changes in external conditions such as temperature or intensity.

Accordingly, as a light refraction change is triggered in the grating when the grating is deformed due to an action of physical force onto the optical fiber formed with the gratings, the FBG sensor measures a strain rate of the optical fiber by measuring the above refraction change, thereby measuring the strain rate of a structure to which the optical fiber is fixed, so that loads and stresses acting on the structure may be outputted.

In addition, the FBG sensor is used as a sensor that detects strain rate, angle, acceleration, displacement, temperature, pressure displacement, and the like by using the principle of total reflection in which light within a predetermined angle is entirely reflected from an interface therebetween when the light proceeds from a material having a high refractive index to a material having a low refractive index in the optical fiber.

For example, the applicant of the present invention has disclosed and submitted the application and obtained the registration on a technology using the FBG sensor which are described in patent documents 1 and 2 as below.

Meanwhile, according to a measuring device using an optical fiber Bragg grating sensor in the related art, an optical fiber arranged with an optical fiber Bragg grating sensor is inserted into a straight protective tube, and the optical fiber is fixed to both ends of the protective tube by coupling fixing members, so that the fixing members may prevent the optical fiber inside the protective tube from being deformed by external stress.

Accordingly, in order to facilitate an accurate measurement in the measuring device using an optical fiber Bragg grating sensor according to the related art, the external temperature is required to pass through the protective tube and be transmitted only to the optical fiber therein, and only the optical fiber of the protective tube is required to be deformed according to temperature changes.

In general, the fiber Bragg grating (FBG) sensor has a very fine deformation range between −0.5 nm and +0.5 nm.

However, in the measuring device using an optical fiber Bragg grating sensor according to the related art, since the protective tube expands or contracts according to changes of the external temperature and the optical fiber is fixed by the fixing members, the optical fiber also expands and contracts in association with the changes in expansion and contraction of the protective tube.

Accordingly, when the optical fiber is elastically deformed, an error value due to the expansion and contraction is added in addition to a deformation value due to the external temperature. Thus, the measured value has an error.

Figure 1:
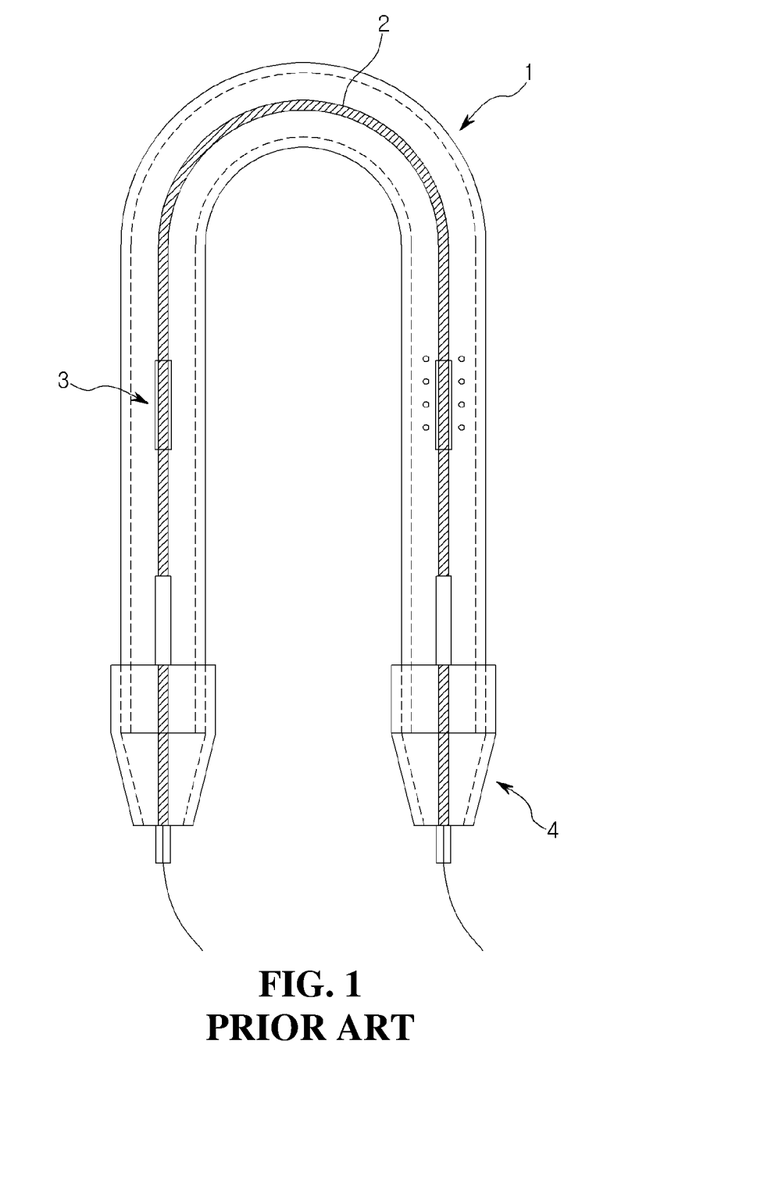
FIG. 1 is a view showing a configuration of a measuring device using an optical fiber Bragg grating sensor according to the related art.
Figure 2:
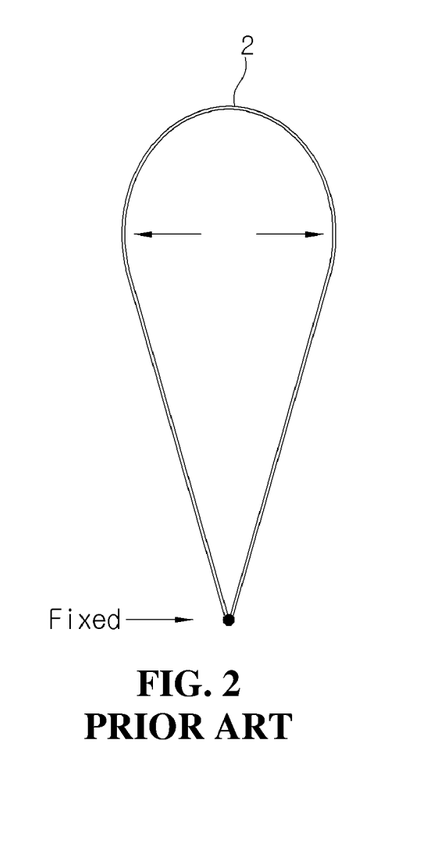
FIG. 2 is a view illustrating a state in which an optical fiber is bent.

FIG. 1 is a view showing a configuration of a measuring device using an optical fiber Bragg grating sensor according to the related art. FIG. 2 is a view illustrating a state in which an optical fiber is bent.

In order to solve the above problems, as shown in FIG. 1, patent document 3 discloses a configuration of a measuring device including a protective tube including at least one bent part, an optical fiber spaced apart from an inner wall of the protective tube, and an optical fiber Bragg grating sensor arranged on one side of the optical fiber to measure a temperature.

Meanwhile, the optical fiber is also required to be bent to have the same curvature as that of the bent part in order to arrange the optical fiber inside the bent part formed in the protective tube.

To this end, when a strand of the optical fiber is bent, there is a limit in the curvature capable of maintaining the optical fiber in a bent state even when the optical fiber is maximally bent, because the optical fiber has inherent stiffness and elasticity.

As shown in FIG. 2, even when both ends of the optical fiber are fixed, the bending curvature of the bent optical fiber may increase due to the elasticity applied outward of the bent optical fiber in the arrow direction shown in FIG. 2, that is, due to the elasticity of the optical fiber applied in the vertical direction, so that a diameter of the curved optical fiber may increase.

Accordingly, when the measuring device is manufactured by bending a strand of the optical fiber, it is difficult to miniaturize the measuring device to have a size smaller than a critical diameter for maintaining the optical fiber in a bent state.

In particular, when an actual curved optical fiber is installed inside the protective tube, the optical fiber cannot maintain the inverse-U shape.

Accordingly, it is difficult to apply patent document 3 to an actual product.

In addition, according to the measuring device using the optical fiber Bragg grating sensor in the related art, since the measuring device is connected to only one end of both ends of the optical fiber, the temperature cannot be measured using both ends of the measuring device.

(Patent Document 1) Korean Registered Patent No. 10-1057309 (Published on Aug. 16, 2011)

(Patent Document 2) Korean Registered Patent No. 10-0992628 (Published on Nov. 5, 2010)

(Patent Document 3) Korean Registered Patent No. 10-1504028 (Published on Mar. 18, 2015)

DISCLOSURE

Technical Problem

To solve the above-mentioned problems, an object of the present invention is to provide a temperature measuring device using an optical fiber Bragg grating sensor to measure a temperature of an object to be measured by measuring the optical fiber Bragg grating sensor.

Another object of the present invention is to provide a temperature measuring device using an optical fiber Bragg grating sensor in which an optical fiber is bent to reduce a diameter of the bent portion so as to miniaturize the temperature measuring device.

A still another object of the present invention is to provide a temperature measuring device using an optical fiber Bragg grating sensor in which a diameter of a bent portion of the optical fiber is adjusted according to a shape and a size of an object to be measured, so that a size of the temperature measuring device is variously varied.

Technical Solution

To achieve the above-mentioned objects the temperature measuring device using an optical fiber Bragg grating sensor according to the present invention includes: a ring part having a preset diameter; an optical fiber wound on the ring part and maintained in a predetermined shape, a housing arranged therein with the optical fiber; and an optical fiber Bragg grating sensor installed in a portion arranged parallel to each other in the optical fiber.

Advantageous Effects

As described above, according to the temperature measuring device using an optical fiber Bragg grating sensor of the present invention, a temperature can be accurately measured according to intrinsic temperature properties of the sensor without being influenced by the elasticity of the external housing onto the optical fiber Bragg grating sensor.

In other words, according to the present invention, the optical fiber can be installed inside the housing and spaced apart from the inner wall surface at a predetermined distance by maintaining a predetermined shape, such as a curved part curved in an inverse-U shape by winding an optical fiber on a ring having a predetermined diameter by a predetermined times, a pair of parallel parts arranged parallel to each other, a straight section, or the like.

Thus, according to the present invention, even when the housing is deformed due to external temperature changes, the optical fiber and the optical fiber Bragg grating sensor spaced apart at a predetermined distance inside the housing are prevented from being deformed, so that the temperature can be accurately measured without distortion.

In addition, according to the present invention, the optical fiber is bent to reduce the diameter of the bent portion, so that the temperature measuring device can be miniaturized, and the diameter of the bent portion of the optical fiber is adjusted according to the shape and the size of the object to be measured, so that the size of the temperature measuring device can be variously adjusted.

In addition according to the present invention, a pair of fiber optical Bragg grating sensors are installed at the both sides of the optical fiber, respectively, so that the temperature can be measured using the both ends of the optical fiber.

In addition, according to the present invention, the temperature measurement optical fiber Bragg grating sensor and the humidity measurement optical fiber Bragg grating sensor are installed at the both sides of the optical fiber, so that the temperature and the humidity can be measured simultaneously.

BEST MODE

Mode for Invention

Hereinafter, a temperature measuring device using an optical fiber Bragg grating sensor according to a preferred embodiment of the present invention will be described with reference to the accompanying drawings.

Figure 3:
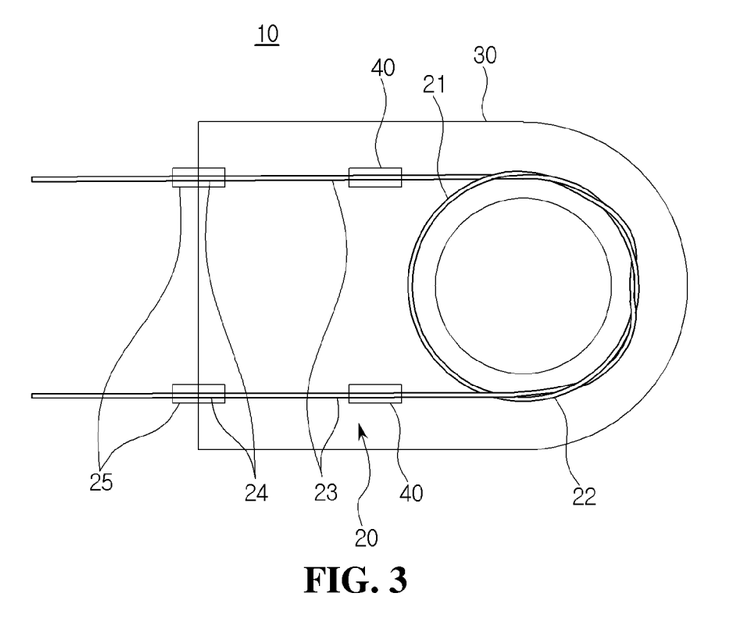
FIG. 3 is a view showing a configuration of the temperature measuring device using a fiber optical Bragg grating sensor according to the exemplary embodiment of the present invention.

FIG. 3 is a view showing a configuration of the temperature measuring device using a fiber optical Bragg grating sensor according to the exemplary embodiment of the present invention.

Hereinafter, the terms indicating directions such as "left", "right", "front", "rear", "upper" and "lower" are defined to indicate directions on the basis of statuses shown in drawings, respectively.

According to the present invention, an optical fiber is wound on a ring part having a preset diameter to form a bent part of the optical fiber so as to be miniaturized according to a shape and a size of an object measured in temperature or an object installed with a measuring device (hereinafter referred to as 'object'), and a diameter of the bent part is minimized, so that the temperature measuring device can be miniaturized.

Specifically, as shown in FIG. 3, a temperature measuring device 10 using an optical fiber Bragg grating sensor according to an exemplary embodiment of the present invention includes: an optical fiber 20 wound around a ring part 21 having a predetermined diameter and bent in an inverse-U shape; and a housing 30 arranged therein with the optical fiber 20.

The optical fiber 20 may include a ring part 21 formed in a ring shape to have a preset diameter to correspond to a shape and a size of the object, a bent part 22 wound one time or more on the ring part 21 to maintain a curved shape, a pair of parallel parts 23 extending from both sides of the bent part 22 and parallel to each other, and a pair of fixing parts 24 extending from the pair of parallel parts 23 and fixed to the housing 30.

Since the bent part 22 is formed between the pair of parallel parts 23, the pair of parallel parts 23 may be kept parallel to each other.

The pair of fixing parts 24 extending from the pair of parallel parts 23 are fixed to the housing 30 and drawn out through one end of the fixed housing 30 so as to be connected to a measurement terminal (not shown).

Optical fiber Bragg grating sensors 40 are installed on the pair of parallel parts 23, and the optical fiber Bragg grating sensors 40 change in length or refractive index according to temperature changes of the object.

Accordingly, the measurement terminal may measure a temperature by sensing a change in wavelength of light outputted from the optical fiber Bragg grating sensor 40.

The pair of fixing parts 24 are fixed to the housing 30, in which a coating layer 25 for protecting the fixing parts 24 may be formed on outer surfaces of the pair of fixing parts 24 to prevent damages due to external shock or vibration.

The housing 30 may be formed in a substantially hexahedral shape, and an installation space may be formed in the housing 30 to install the ring part 21, the bent part 22, and the parallel parts 23 of the optical fiber 20 therein.

Preferably, the installation space may be formed to have a volume greater than a volume of the optical fiber 20 so that the inner wall surface of the housing 30 and the optical fiber 20 are spaced apart from each other.

In addition, the pair of fixing part 24 are fixed to one side end of the housing 30, for example, a left end when viewed in FIG. 3.

The other side end of the housing 30, that is, the right side when viewed in FIG. 3 may have a rounded curved surface in a semicircular shape having a diameter greater than a diameter of the ring part 21 and the bent part 22 of the optical fiber 20.

A right portion of the housing 30 may be formed with a through-hole in a circular shape having a diameter smaller than the diameter of the ring part 21 and the bent part 22 of the optical fiber 20.

In other words, the ring part 21, the bent part 22, the housing 30, and the through-hole may be formed in a circular or semicircular shape having different diameters to be spaced apart from each other by predetermined distances.

Accordingly, according to the present invention, the optical fiber may be wound on the ring part to form a curved shape, and arranged inside the housing so as to be spaced apart from the inner wall surface of the housing by a predetermined distance.

Next, a coupling structure and an operating method of the temperature measuring device using the fiber optic Bragg grating sensor according to an exemplary embodiment of the present invention will be described with reference to FIGS. 3 to 6.

Figure 4A:
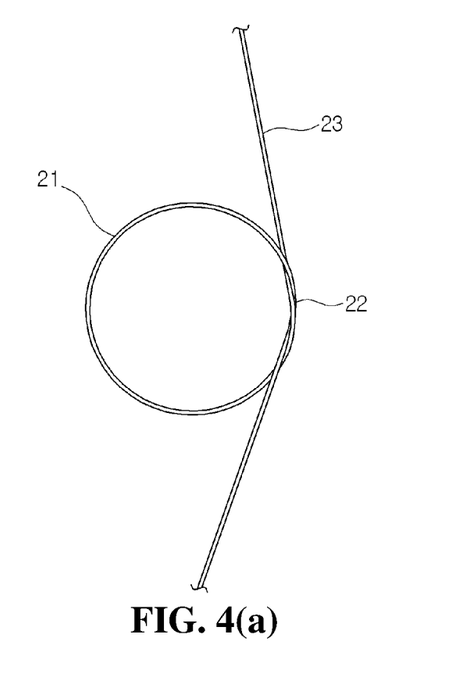
FIGS. 4(a)-4(b) to 6 are views showing a process of winding an optical fiber on a ring part.
Figure 4B:
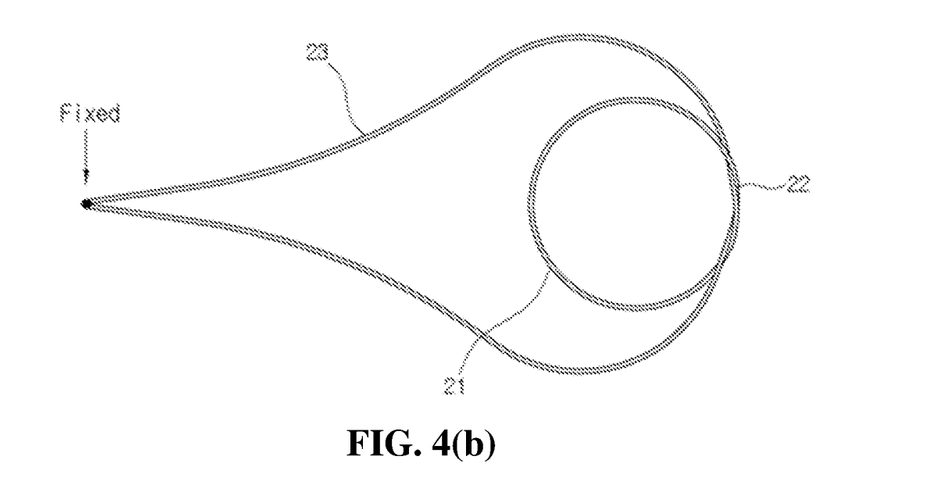
Figure 5A:
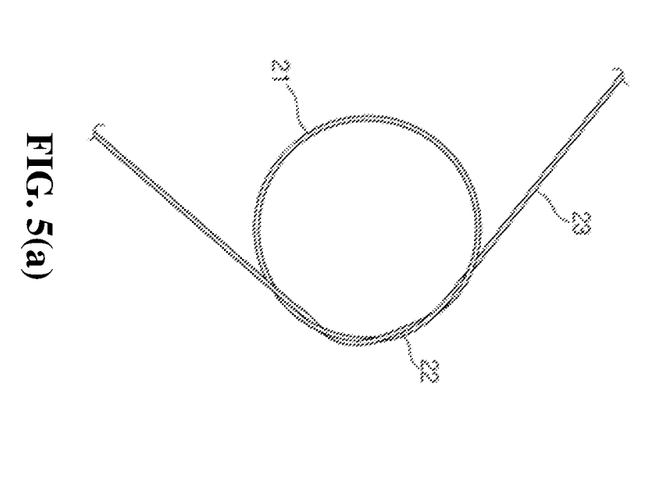
Figure 5B:
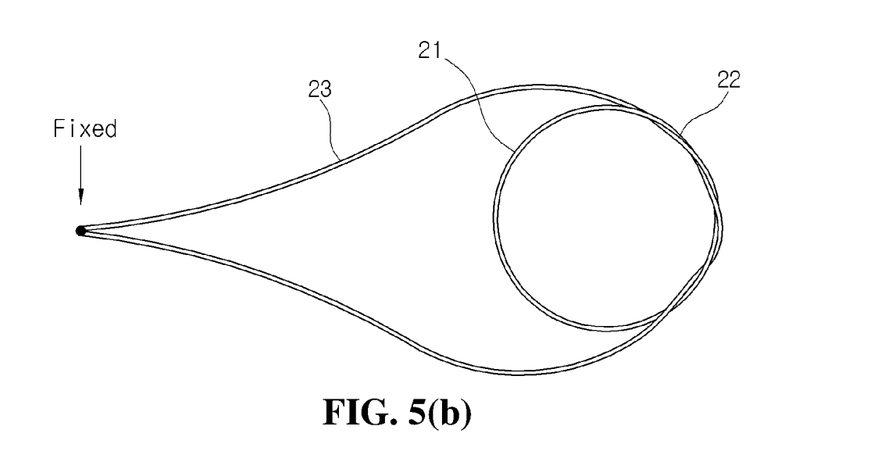
Figure 6:
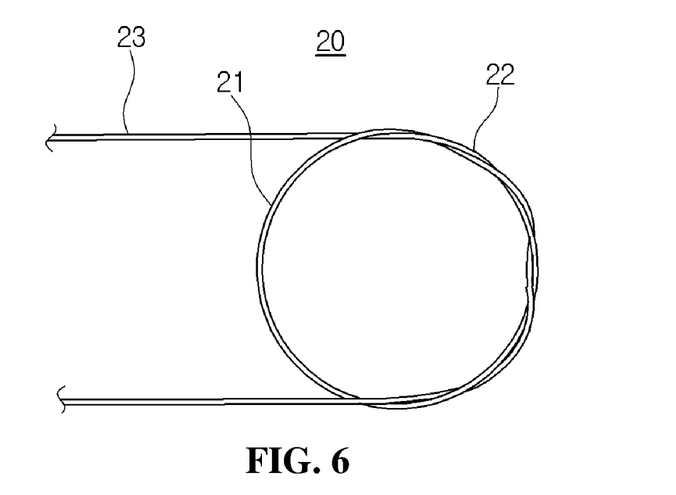

FIGS. 4(a)-4(b) to 6 are views showing a process of winding an optical fiber on a ring part.

FIGS. 4(a) and (b) and 5(a) and (b) show a state in which the optical fiber is wound once and twice on the ring part and a state in which both ends of the optical fiber are fixed to each other. FIG. 6 shows a state in which the optical fiber is wound three times on the ring part.

First, an operator rotates a portion of the optical fiber 20 once to form the ring part 21, and then winds one end of the optical fiber 20 on the ring part 21 a predetermined number of times to form the bent part 22 and the parallel parts 23.

For example, in the embodiment, a diameter of the ring part 21 may be set as about 10 mm to about 15 mm.

The present invention is not limited thereto, and the diameter of the ring part may be modified and set according to a shape and a size of an object to be measured or an object to which the temperature measuring device is attached.

As shown in FIG. 4(a), when one end of the optical fiber 20 is wound on the ring part 21 once, both ends of the optical fiber 20 are spread upward and downward at an angle close to about 180°, respectively.

Accordingly, as shown in FIG. 4(b), even when the both ends of the optical fiber 20 are fixed, the optical fiber 20 may be curved in an arc shape having a curvature greater than a curvature of the ring part 21, that is, a diameter greater than a diameter of the ring part 21, about the bent part 22 wound on the ring part 21.

In addition, as shown in FIG. 5(a), when the one end of the optical fiber 20 is wound on the ring part 21 twice, the both ends of the optical fiber 20 are spread upward and downward at an angle about 90°, respectively.

Accordingly, as shown in FIG. 5(b), even when the both ends of the optical fiber 20 are fixed, the optical fiber 20 may be curved in an arc shape having a curvature greater than a curvature of the ring part 21, that is, a diameter greater than a diameter of the ring part 21, about the bent part 21 wound on the ring part 21.

In contrast, as shown in FIG. 6, when the one end of the optical fiber 20 is wound on the ring part 21 three times, the both ends of the optical fiber 20 are arranged parallel to each other.

In other words, as shown FIGS. 4(a)-4(b) and 5(a)-5(b), when the optical fiber 20 is wound on the ring part 21 once or twice, the both ends of the optical fiber 20 are spread upward and downward at a predetermined angle, respectively.

Accordingly, the parallel parts 23 cannot be obtained even when the optical fiber 20 is wound on the ring part 21. Thus, the temperature measuring device 10 cannot be miniaturized.

However, when the optical fiber is wound on the ring part 21 three times as shown in FIG. 6, the both ends of the optical fiber 20 are arranged parallel to each other, so that the parallel part 23 may be obtained.

The present invention is not limited thereto, and the number of times of winding the optical fiber 20 on the ring part 21 may be variously modified according to the diameter of the ring part 21, so that the parallel part 23 can be obtained.

Thus, in the measuring device 10 according to the embodiment of the present invention, since the housing 30 has a fine length deformation due to thermal expansion when the external temperature rises, an upper end of the housing 30 expands slightly upward.

Even when the above deformation of the housing 30 occurs, there is a separation distance between the inner wall surface of the housing 30 and the optical fiber 20, so that the optical fiber 20 may be prevented from coming into contact with the inner wall surface of the housing 30, and the intrinsic length of the optical fiber 20 may be prevented from being changed due to the deformation of the housing 30.

In contrast, even when the housing 30 contracts due to the decrease of the external temperature, the inherent length of the optical fiber 20 is not changed.

Therefore, according to the present invention, even when the housing is deformed due to external temperature changes, the optical fiber and the optical fiber Bragg grating sensor spaced apart at a predetermined distance inside the housing are prevented from being deformed, so that the temperature can be accurately measured without distortion.

In addition, according to the present invention, a pair of fiber optical Bragg grating sensors are installed at the both sides of the optical fiber, respectively, so that the temperature can be measured using both ends of the optical fiber.

Figure 7:
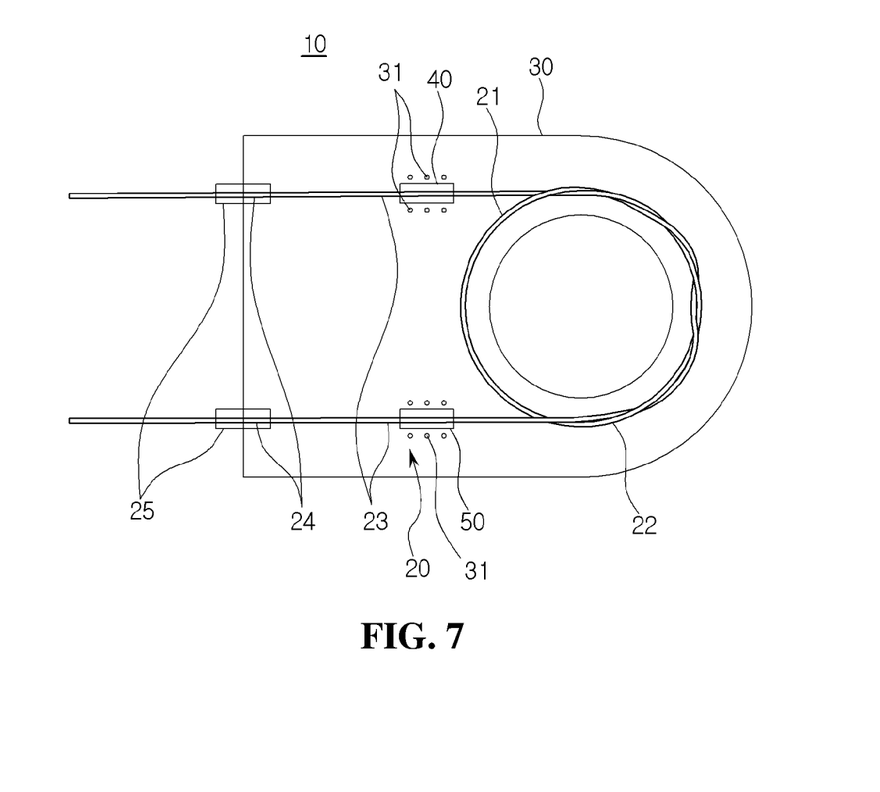
FIG. 7 is a view showing a configuration of the temperature measuring device using a fiber optical Bragg grating sensor according to another embodiment of the present invention.

Meanwhile, FIG. 7 is a view showing a configuration of a temperature measuring device using a fiber optical Bragg grating sensor according to another embodiment of the present invention.

In a temperature measuring device 10 using an optical fiber Bragg grating sensor according to another embodiment of the present invention, as shown in FIG. 7, a temperature measurement optical fiber Bragg grating sensor 40 may be installed at one of the pair of parallel parts, and an humidity measurement optical fiber Bragg grating sensor 50 may be installed at the other one.

The humidity measurement optical fiber Bragg grating sensor 50 may be provided after coating carbon on an outer surface of the optical fiber Bragg grating sensor.

Accordingly, when external moisture is adsorbed on the carbon, a volume of the humidity measurement optical fiber Bragg grating sensor 50 increases, and thus a length of the optical fiber 20 also increases.

Accordingly, the measurement terminal is connected to one end of the optical fiber 20 connected to the humidity measurement optical fiber Bragg grating sensor 50, so that the humidity may be measured based on changes in wavelength of light due to the length deformation of the optical fiber 20.

Preferably, a ventilation part 31 may be formed in the housing 30 to allow external air to be smoothly introduced into a position corresponding to the humidity measurement optical fiber Bragg grating sensor 50, such that a function of the humidity measurement optical fiber Bragg grating sensor 50 is improved.

The ventilation part 31 may be formed with at least one through-hole.

The ventilation part 31 may also be formed at a position corresponding to the optical fiber Bragg grating sensor 40.

Thus, according to the present invention, the temperature measurement optical fiber Bragg grating sensor and the humidity measurement optical fiber Bragg grating sensor are installed at the both sides of the optical fiber, so that the temperature and the humidity can be measured simultaneously.

Figure 8:
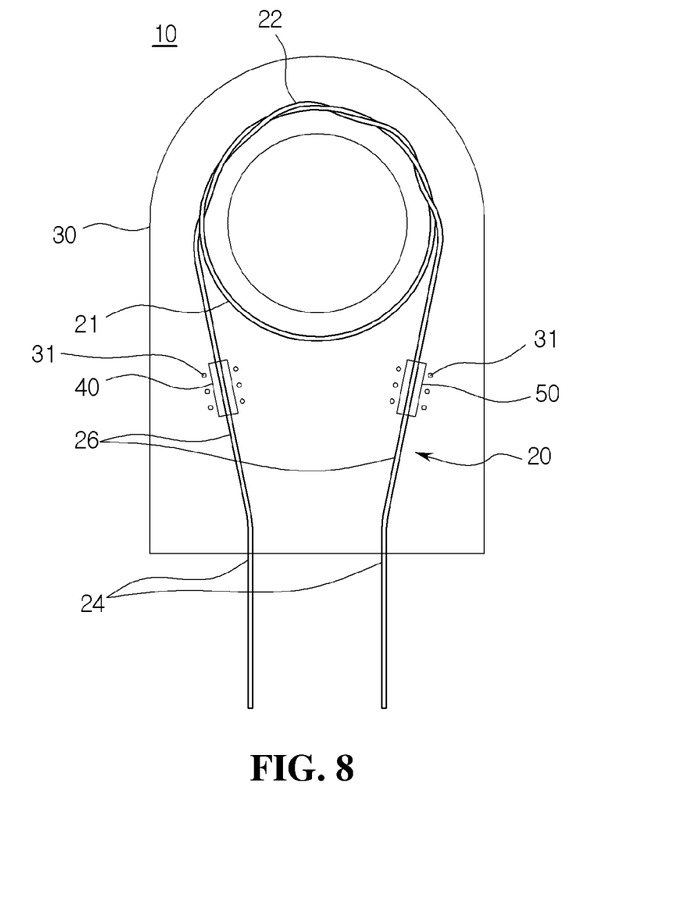
FIG. 8 is a view showing a configuration of a temperature measuring device using a fiber optical Bragg grating sensor according to still another embodiment of the present invention.

FIG. 8 is a view showing a configuration of a temperature measuring device using a fiber optical Bragg grating sensor according to still another embodiment of the present invention.

In a temperature measuring device 10 using an optical fiber Bragg grating sensor according to still another embodiment of the present invention, as shown in FIG. 8, the one end of the optical fiber 20 may be modified to be wound on the ring part 21 four times.

In other words, in the above embodiment, the pair of parallel portions 23 is formed by winding the optical fiber 20 three times.

In contrast, in the present embodiment, as shown in FIG. 8, the optical fiber is wound four times or more, so that an upper portion of the optical fiber 20 may be maintained in a substantially semicircular shape, and a lower portion of the optical fiber 20 may be maintained in a substantially 'V' shape.

Thus, according to the present invention, the both ends of the optical fiber are not required to be arranged in parallel, and it is preferable that the upper and lower portions of the optical fiber are maintained in predetermined shapes without being moved, respectively, by increasing the number of windings on the ring part.

Accordingly, the temperature measurement optical fiber Bragg grating sensor 40 and the humidity measurement optical fiber Bragg grating sensor 50 may be installed in straight sections 26 maintained in a straight line at both sides of the optical fiber 20.

In addition, in the above embodiments, although it has been described that one strand of the optical fiber 20 is rotated once to form the ring part 21, and the one end of the optical fiber 20 is wound on the ring part 21, the present invention is not limited thereto In other words, the present invention may be modified in which the ring portion 21 is separately manufactured to form a ring shape, and the optical fiber 20 is wound on the ring part 21.

The ring part 21 may be manufactured to have various diameters using various materials.

However, it is preferable to manufacture the ring part 21 by using a separate optical fiber 20 to have the same thermal expansion coefficient as that of the optical fiber 20 according to changes in temperature in the process of measuring the temperature using the temperature measuring device 10.

The present invention implemented by the inventor has been described in detail according to the above embodiments, however, the present invention is not limited to the embodiments and may be modified variously within the scope without departing from the invention.

INDUSTRIAL APPLICABILITY

The present invention may be applied to a technology on a measuring device using a fiber optical Bragg grating sensor, in which an optical fiber and the optical fiber Bragg grating sensor spaced apart at a predetermined distance inside a housing are prevented from being deformed even when the housing is deformed due to external temperature changes, so that a temperature may be accurately measured without distortion.

The invention claimed is:

1. A temperature measuring device using an optical fiber Bragg grating sensor, the temperature measuring device comprising:
    an optical fiber wound one or more times on a ring part, which is formed by rotating a portion of the optical fiber to have a preset diameter, to maintain a predetermined shape;
    a housing in which the optical fiber is arranged; and
    the optical fiber Bragg grating sensor installed in a portion having a straight line in the optical fiber.

2. The temperature measuring device of claim 1, wherein a diameter of the ring part is changeable to correspond to a shape and a size of an object to be measured or an object to which the measuring device is attached, and the optical fiber is wound on the ring part a different number of times according to the diameter of the ring part.

3. The temperature measuring device of claim 2, further comprising:
a humidity measurement optical fiber grating sensor installed in the portion having the straight line of the optical fiber.

4. The temperature measuring device of claim 1, wherein the ring part comprises a material having a thermal expansion coefficient a same as a thermal expansion coefficient of the optical fiber.

5. The temperature measuring device of claim 4, wherein
a diameter of the ring part is changeable to correspond to a shape and a size of an object to be measured or an object to which the measuring device is attached, and
the optical fiber is wound on the ring part a different number of times according to the diameter of the ring part.

6. The temperature measuring device of claim 5, further comprising:
a humidity measurement optical fiber grating sensor installed in the portion having the straight line of the optical fiber.

* * * * *